United States Patent Office 2,965,517
Patented Dec. 20, 1960

2,965,517

PROCESS FOR PRODUCING ANTISTATIC DRESSINGS ON SYNTHETIC FIBERS

Otto Albrecht, Munchenstein, Alfred Berger, Basel, and Arthur Maeder, Therwil, Switzerland, assignors to Ciba Limited, Basel, Switzerland No Drawing. Filed Jan. 16, 1959, Ser. No. 787,103

Claims priority, application Switzerland Jan. 21, 1958

5 Claims. (Cl. 117—138.8)

This invention is based on the observation that antistatic dressings that are resistant to washing can be produced on synthetic fibers, by impregnating the fibers with an aqueous preparation which contains (a) a water-soluble polyglycidyl ether of a diol of the general formula

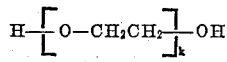

in which $k$ is a whole number from 1 to 15, (b) at least one polyamine, and (c) anions of an acid, at least one polyamine being an alkylene polyamino and at least one amino being capable of acting as a hardening agent, and the proportion of the polyamine being in excess of the quantity required to form a neutral salts of the alkylene polyamine with the said anions, and which preparation contains more than one epoxy-equivalent par equivalent of the acid of the anions, and the impregnated fibers are dried and then subjected to a heat treatment.

As synthetic fibers to be treated by the process of this invention there may be mentioned, for example, fibers of cellulose esters such as cellulose diacetate or triacetate, polyacrylonitrile fibers and polyamide fibers, for example, those of ε-caprolactam or of a polyamide of adipic acid and hexamethylene diamine, and also polyester fibers of the glycol terephthalic acid type, polyurethane fibers, polyvinyl chloride fibers or polyvinylidene chloride fibers. There may also be used in the process fibers of copolymers or mixtures of different synthetic fibers or mixtures of synthetic and natural fibers. The process is especially advantageous for the treatment of fibers or fabrics of cellulose acetate, polyamides, polyesters or polyacrylonitrile.

The aqueous preparation may be prepared by mixing together the necessary ingredients in water with the observance of the aforesaid conditions. Thus, care must be taken that the polyamine is present in excess of the quantity required to form a neutral salt of the alkylene polyamine. The words "neutral salt" are not used herein to denote salts in which every amino group of the alkylene polyamine is combined with one equivalent of acid, but mean that a dilute aqueous solution of the salt is at least approximately neutral, that is to say, the solution has a pH value which is at most only a little higher or lower than 7, and advantageously does not differ from 7 by more than −1 of ±0.5.

When the alkylene polyamine is also capable of acting as a hardening agent, the amine which is present in excess of the amount required to form the neutral salt may be the same amine or an amine belonging to the same group of amines.

The aqueous preparations used in the process of this invention also contain a polyglycidyl ether of a diol of the above formula, and the quantity thereof is such as to provide more than one epoxide group per equivalent of the acid of the anions. Advantageously 1.2 to 1.8, and advantageously 1.4 to 1.6, epoxy-equivalents are present per equivalent of acid. If a smaller proportion is present the resistance to washing of the dressings is considerably poorer and ceases to exist when only one epoxy-equivalent is present per equivalent of acid.

The proportion of the amine serving as hardening agent depends on the difference between the quantity of the polyepoxy-compound used and the above defined equivalent quantity. A good resistance to washing is obtained when the proportion of amine used as hardening agent amounts to 0.2 to 2, and advantageously 0.5 to 1.5, amino groups per excess epoxy group. Thus, for example, when triethylene tetramine is used $\frac{1}{20}$ to $\frac{1}{2}$ a molecular proportion of the amine is required per excess epoxy group. However, a good resistance to washing can be obtained even with wide departures from these proportions, depending on the alkylene polyamine used. For example, if the aqueous preparation contains a polyglycidyl ether as defined above containing 4.0 epoxy equivalents per kilogram, the salt of diethylene triamine neutralized with 2 mols of HCl (equivalent weight $\frac{176}{2} = 88$)

and as hardening agent triethylene tetramine having an equivalent weight calculated on the amino groups of $$\frac{146}{4} = 36.5$$

the proportions of these ingredients may be as follows:

(1) 375 parts of the polyglycidyl ether, corresponding to 1.5 epoxy-equivalents
(2) 88 parts of the neutral diethylene triamine hydrochloride, which are equivalent to one epoxy-equivalent of the polyglycidyl ether, and
(3) 18.25 parts of triethylene tetramine, which are equivalent to the 0.5 excess equivalent of the polyglycidyl ether Generally speaking the aqueous preparations should contain the following ratios of equivalents: For 1.2 to 1.8 epoxy-equivalents of the polyglycidyl ether, one acid equivalent of the neutral alkylene polyamine salt and 0.2 to 0.8 equivalent of amine as hardening agent, one equivalent being calculated on 0.2 to 2 amino groups.

Among alkylene polyamines there are to be understood, as is known in the art, polyamines of which all the amino groups are bound to alkylene groups, which latter groups are linked together directly or through

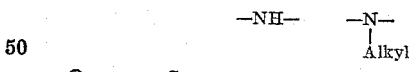

—O— or —S—.

For the purposes of the invention there come into consideration alkylene or polyalkylene polyamines containing primary, secondary and/or tertiary amino groups. As examples there may be mentioned: Ethylene diamine, diethylene triamine, triethylene tetramine, tetraethylene pentamine, 1:2-diamino-2-methylpropane, N:N-dimethyl-1:3-propylene diamine, tetramethyl-diethylene triamine, pentamethyl-diethylene triamine, hexamethyl-triethylene tetramine, diaminoethyl ether and diaminoethyl sulphide. The substituted alkylene polyamines may contain, inter alia, aliphatic saturated or unsaturated, and advantageously unbranched, alkyl groups which may be bound through a bridge member, such as —CO—, to a nitrogen atom, residues of the formula

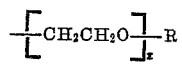

in which $x$ represents a whole number, and R represents a hydrogen atom or an alkyl or acyl group or the residue of the formula —AY, in which A represents an alkylene radical and Y represents substituents such as —CN, halogen or

There are also suitable amines obtainable by the additive combination of acrylonitrile with an amine followed by reduction of the nitrile group to the amine, and also substitution products of such amines. There may also be used reaction products of alkylene polyamines with condensation products of polyethylene glycols with epichlorhydrin which condensation products contain terminal chlorhydrin groups.

The anions of acids (c) which are also present in the aqueous preparations are preferably anions of a mineral acid, for example, a hydrochloric acid, sulfuric acid or ortho-phosphoric acid. However, anions of organic acids, such as formic acid, acetic acid, succinic acid or benzoic acid, are also suitable.

The water-soluble polyglycidyl ethers used in the process of this invention are compounds having an epoxy equivalence greater than 1 and derived from idols of the general formula

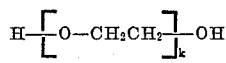

in which $k$ is a whole number from 1 to 15, and preferably from 1 to 7.

When the polyglycidyl ether compound is unitary and none of the epoxy groups is modified, the epoxy equivalence, that is to say, the average number of epoxy groups present in the average molecule, is 2. In the case of polymeric compounds they may contain some monomeric monoepoxides, or the epoxy groups may be hydrated or modified in other ways, and/or there may be present macromolecules of samewhat varying molecular weight, so that the epoxy equivalence may be less than 2 and not a whole number. Polymeric compounds may, for example, have an epoxy equivalence of 1.5 or 1.8. The content of epoxy groups in a compound is most advantageously expressed as the number of mols of epoxide groups per kilogram of epoxy-compound (epoxy equivalents per kg.). Suitable diols of the above general formula are: ethylene glycol, diethylene glycol, triethylene glycol, tetraethylene glycol and polyethylene glycols having molecular weights within the range of 200 to 650, and preferably 200 to 300.

The polyglycidyl ethers are obtained by reacting these diols with an epihalogenhydrin, advantageously epichlorhydrin, in the presence of a Friedel-Crafts catalyst, and advantageously in the presence of complex compound of boron trifluoride, and then dehydrohalogenating the product with an agent capable of binding hydrogen halide.

The polyglycidyl ethers to be used in the process are water-soluble compounds and they contain 1.0 to 11.5, and advantageously 1.5 to 6, epoxy equivalents per kilogram.

Hardening agents suitable for the present purpose are the known aliphatic, aromatic, alicyclic or heterocyclic polyamines that contain primary, secondary or tertiary amino groups, such, for example, as ethylene diamine, triethylene tetramine, cyclohexyl diamine, piperazine, 2:4:6-tri-(dimethylaminomethyl)-phenol, N:N-diethyl-1:3-propane diamine and metaphenylene diamine. There are also suitable fully methylated alkylene polyamines such as pentamethyl-diethylene triamine or hydroxyalkylated amines, such as the addition product of 5 mols of ethylene oxide with 1 mol of diethylene triamine. As a rule higher hardening temperatures are required with such amines.

As stated above, it is often of advantage to use an aqueous preparation containing only one alkylene polyamine, which is present partially in the form of a neutral salt thereof and partially in the form of the free base, which enable it to act as a hardening agent. The aqueous preparation may contain, for example, 1.8 epoxy equivalents of a polyglycidyl ether of the kind defined above, 1 acid equivalent of a neutral triethylene tetramine salt and 0.8 equivalent of free triethylene tetramine. There may also be used a reaction product of epichlorohydrin with an alkylene polyamine, in which a part of the basic amino groups are neutralized by the hydrochloric acid formed during the reaction.

As stated above, the aqueous preparations may be prepared by mixing together the requisite ingredients in water. For example, the quantity of acid required by the polyamine to form the neutral salt and the relative proportions of acid and amine, taking into consideration the amount of hardening agent required having regard to the excess epoxy groups present, can be determined by preliminary tests. It is generally simpler to prepare the neutral salt of the amine and the acid, and to dissolve or disperse the salt and the free amine serving as hardening agent and the epoxy compound in water. If desired, the free amine serving as hardening agent may be mixed with the neutral polyamine salt, so that the preparation can be prepared in a very simple manner by dissolving the aforesaid mixture in water and then adding the epoxy-compound.

The concentration of the preparation, that is to say the concentration of the necessary ingredients (a), (b) and (c) in water, may vary within wide limits. The concentration is advantageously so chosen that a quantity corresponding to about 0.1 to 2 parts of the neutral polyamine salt per 100 parts of fibrous material can be applied to the material by the usual impregnation methods. The concentration of the polyglycidyl ether is generally so chosen that 100 parts of the impregnating solution contain 0.2 to 8, and advantageously 0.4 to 4, parts of the polyglycidyl ether.

The impregnation of the textile fibers with the aqueous preparation is advantageously carried out by an appropriate known method at room temperature, for example, on a padding machine. Prior to the hardening treatment, the fibers are dried, advantageously at not too high a temperature, for example, at 30° C. to 50° C. The higher the hardening temperature, the shorter is the period needed for hardening. Thus at 40° C. about 4 hours, at 80° C. 1 to 1½ hours, at 100° C. 20 to 30 minutes, and at 120° C. about 5 to 10 minutes, are required for hardening. Temperatures within the range of 110° C. to 130° C. are especially advantageous. A higher temperature, for example, 150° C. may be used, but there is then a risk of causing yellowing of the material.

In the examples given below polyester, polyamide, cellulose acetate and polyacrylonitrile fibers are padded in the baths described, and then squeezed until 0.3 to 0.8%, and preferably 0.4 to 0.6%, of the neutral polyamine salt remains on the fibers. The fibers are then dried at about 40° C. and hardened as described.

Particulars of the polyglycidyl ethers A, B, C and D used in the examples are as follows:

$A=$polyglycidyl ether of ethylene glycol containing 4.0 epoxy equivalents per kg.

$B=$polyglycidyl ether of diethylene glycol containing 5.8 epoxy equivalents per kg.

$C=$polyglycidyl ether of triethylene glycol containing 4.65 epoxy equivalents per kg.

$D=$polyglycidyl ether of polyethylene glycol having an average molecular weight of 300 and containing 3.2 epoxy equivalents per kg.

In all cases there is a considerable improvement in the anti-static properties, and the latter properties are not substantially impaired by washing.

The following examples illustrate the invention, the parts and percentages being by weight:

Example 1

The aqueous impregnation bath contains, per liter, 9 parts of the neutral salts of hexamethyl triethylene tetramine with about 2 mols of hydrochloric acid, 27 parts of polyglycidyl ether A and 1.35 parts of triethylene tetramine. A polyamide fabric is padded with the bath, squeezed to a weight increase of 55%, dried and hardened for 10 minutes at 120° C. The fabric so treated has an anti-static dressing which is resistant to washing.

Similar results are obtained by using 0.45 part or 2.7 parts of triethylene tetramine per liter, or by heating for 20 to 30 minutes at 100° C., or for 4 hours at 40° C.

Example 2

Tetraethylene pentamine is reacted with 7 mols of ethylene oxide and then neutralized with hydrochloric acid. The impregnation bath contains per liter 7 parts of this product, 21 parts of polyglycidyl ether A and 1.4 parts of triethylenetetramine.

Cellulose acetate rayon fabric is padded until its weight shows an increase of 71%, then dried and hardened for 1 hour at 120° C. A good anti-static effect is obtained which is resistant to washing.

Example 3

The impregnation bath contains per liter 4.45 parts of a compound consisting of a preponderant share of $C_{18}H_{35}NHCH_2CH_2CH_2NH_2 \cdot 2HCl$, 13.4 parts of polyglycidyl ether A and 0.54 part of triethylenetetramine.

Polyacrylonitrile staple fibers are padded with this solution, squeezed until their weight shows an increase of 111% and then hardened for 5 minutes at 145–150° C. The fibers so treated have an anti-static dressing which is fast to washing.

Example 4

The impregnating bath contains per liter 4 parts of the hydrochloride of the reaction product of $$C_{17}H_{33}CO-NH-CH_2CH_2NH-CH_2CH_2NH_2$$

with 3 mols of ethylene oxide, 12 parts of polyglycidyl ether A and 1.12 parts of triethylenetetramine.

Polyacrylonitrile staple fibers are padded with this solution, squeezed to a weight increase of 121.5% and hardened for 5 minutes at 145 to 150° C. A good anti-static effect is obtained which is fast to washing.

Example 5

(a) The bath contains per liter 9 parts of the neutral hydrochloride of pentamethyl-diethylenetriamine, 27 parts of polyglycidyl ether A and 1.1 parts of triethylenetetramine. Polyamide fabric is padded with this solution, squeezed to a weight increase of 56% and hardened for 5 minutes at 120° C. Triethylenetetramine may be replaced by 6.3 parts of pentamethyl-diethylenetriamine, or by 3.2 parts of tri-(dimethylaminomethyl)-phenol, or by 1.08 parts of 0.54 part of ethylene diamine, the hardening being advantageously performed for 5 minutes at 150° C.

(b) The bath contains per liter 9 parts of the phosphoric acid salt of pentamethyl-diethylenetriamine, 27 parts of polyglycidyl ether A and 1.45 parts of triethylene tetramine. Polyamide fabric is treated as described above under (a).

(c) The bath contains per liter 4.2 parts of the hydrochloride of pentamethyl-diethylenetriamine, 12.5 parts of polyglycidyl ether B and 1.12 parts of triethylenetetramine. Polyacrylonitrile staple fibers are padded, squeezed to a weight increase of 120%, dried and then hardened for 5 minutes at 120° C. The fibers treated possess in each case good electric conductivity which is not impaired even by repeated washing.

Example 6

Cellulose acetate rayon fabric is impregnated in a bath containing per liter 7 parts of the neutral hydrochloride of the reaction product of triethylenetetramine with 2 mols of ethylene oxide, 21 parts of polyglycidyl ether A, and 1.07 parts of triethylenetetramine. The impregnated fabric is squeezed to a weight increase of 78% and hardened for 10 minutes at 120° C. The result achieved is similar to that described in Example 5.

Example 7

The bath contains per liter 7 parts of the neutral hydrochloride of triethylenetetramine, 24.5 parts of polyglycidyl ether A and 0.43 part of triethylenetetramine.

A cellulose acetate rayon fabric is provided with a dressing as described in Example 6, after which it possesses good anti-static properties.

Example 8

The bath contains per liter 9 parts of the compound of the formula

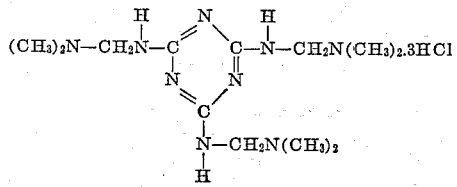

as well as 27 parts of polyglycidyl ether A and 1.7 parts of triethylenetetramine.

Polyamide fabric is padded with this solution until its weight shows an increase of 61%, dried and then hardened for 5 minutes at 145 to 150° C. The fabric so treated has an anti-static dressing which is fast to washing.

Example 9

(a) Polyamide fabric is impregnated in a bath containing per liter 10.7 parts of the neutral salt of pentamethyldiethylenetriamine with succinic acid, 27 parts of polyglycidyl ether A and 0.9 part of triethylenetetramine.

The fabric is squeezed to a weight increase of 55%, dried and then hardened for 5 minutes at 150° C., whereby it is provided with a good anti-static dressing which is fast to washing.

Similarly good results are achieved when the succinic acid salt is replaced by 8.1 parts of the corresponding formic acid salt, or 8.5 parts of the acetic acid salt, or 14.8 parts of the benzoic acid salt of pentamethyl-diethylenetriamine, the impregnated fabric being hardened in each case for 10 minutes at 120° C.

(b) The procedure used is that described in Example 9a, except that the salt used is 12.0 parts of the compound of the formula $$NC-CH_2CH_2NH-CH_2CH_2NH-CH_2CH_2NH-CH_2CH_2CN \cdot 2HNO_3$$

whereby similar results are obtained.

Example 10

A fabric of polyacrylonitrile staple fibers is impregnated in a bath containing per liter 4.54 parts of the hydrochloride of pentamethyl-diethylenetriamine, 13.6 parts of polyglycidyl ether A and 3.2 parts of tris-(dimethylaminomethyl)-phenol. The fabric is squeezed to a weight increase of 110%, dried and hardened for 10 minutes at 120° C. The treated fabric possesses good anti-static properties which are not impaired even by repeated washings.

A practically equally good result is obtained by using only 1.6 parts of tris-(dimethylaminomethyl)-phenol. Instead of tris-(dimethylaminomethyl)-phenol may be used 3.2 parts of pentamethyl-diethylenetriamine or 0.37 part of diethylenetriamine; in the last mentioned case a hardening time of 5 minutes at 150° C. is required.

Example 11

(a) A reaction product of a dimerized fatty acid with a polyamine, marketed under the trade name "Versamid 115" by General Mills, is neutralized with hydrochloric acid. The resulting product is dried and 5.5 parts thereof are dissolved in 1 liter of water together with 6.7 parts of polyglycidyl ether C and 0.4 part of triethylenetetramine.

Polyester fibers are impregnated with this solution, squeezed to a weight increase of 80%, dried and then hardened for 10 minutes at 130° C.

(b) Polyester fibers are impregnated in a bath containing per liter 6.25 parts of the hydrochloride of pentamethyldiethylenetriamine, 18.75 parts of polyglycidyl ether A and 0.75 part of triethylenetetramine. The fibers are then squeezed to a weight increase of 80%, dried and hardened for 10 minutes at 130° C.

In both cases the treated fibers possess good anti-static properties.

Example 12

Polyamide fabric is impregnated in a bath containing per liter 6 parts of the hydrochloride of the reaction product of a dimerized fatty acid with a polyamine mentioned in Example 11a, as well as 10.6 parts of polyglycidyl ether D and 0.43 part of triethylenetetramine.

The fibers are squeezed to a weight increase of 58% and hardened for 10 minutes at 120° C.

Example 13

300 parts of polyethylene glycol 300 are reacted with 185 parts of epichlorohydrin in an ethereal solution of boron tri-fluoride of about 45% strength. 103 parts of diethylenetriamine and 450 parts of butanol are then added, and the whole is kept at the boil for 5 hours. The butanol is then distilled off in vacuo.

4.0 parts of the resulting reaction product—in which some of the amino groups present are in the form of a salt—and 5.0 parts of polyglycidyl ether A are dissolved in 1 liter of water.

Polyacrylonitrile staple fibers are impregnated in this bath, squeezed to a weight increase of 110%, and hardened for 10 minutes at 120° C. The treated fibers have an antistatic dressing which is fast to washing.

Example 14

A stirring flask equipped with thermometer, dropping funnel and reflux condenser is charged with 120 parts of polyethylene glycol 600 and 1.6 parts by volume of an ethereal solution of boron trifluoride of about 45% strength, at 85–90° C., 37 parts of epichlorohydrin are added dropwise, and the mixture is then heated for 4 hours on a boiling water bath. 35 parts of the compound of the formula NCCH$_2$CH$_2$NH—CH$_2$CH$_2$NH—CH$_2$CH$_2$NH—
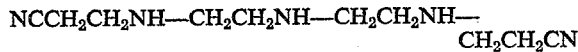
CH$_2$CH$_2$CN are then added, and the reaction is continued for 12 hours on a boiling water bath.

4.7 parts of the resulting neutral product are dissolved in 1 liter of water together with 4.1 parts of polyglycidyl ether A and 0.2 part of triethylenetetramine.

Polyacrylonitrile staple fibers are impregnated in this bath, squeezed to a weight increase of 110% and hardened for 10 minutes at 120° C. The effect achieved is similar to that described in Example 13.

What is claimed is:

1. A process for producing anti-static dressings on synthetic fibers, which comprises impregnating fibers with an aqueous preparation which contains (a) a water-soluble polyglycidyl ether of a diol of the general formula

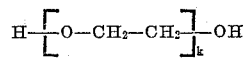

in which $k$ is a whole number from 1 to 15,
(b) at least one polyamine, and
(c) anions of an acid, at least one polyamine being an alkylene polyamine and at least one amine being capable of acting as a hardening agent, the proportion of polyamine being in excess of the quantity of amine required to form a neutral salt of the alkylene polyamine with the anions, and more than one epoxy-equivalent being present per equivalent of the acid of the anions, drying the impregnated material and then subjecting it to a heat treatment.

2. A process for producing antistatic dressings on synthetic fibers, which comprises impregnating the fibers with an aqueous preparation which contains (a) 0.2 to 8 percent by weight of a water-soluble polyglycidyl ether of a diol of the general formula

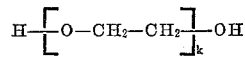

in which $k$ is a whole number from 1 to 7,
(b) at least one polyamine, and
(c) anions of an acid, at least one polyamine being an alkylene polyamine and at least one amine being capable of acting as hardening agent, and the proportion of the polyamine being in excess of the quantity of amine required to form a neutral salt of the alkylene polyamine with said anions, and in which preparation the ratio of the amino groups of the amine serving as hardening agent to the epoxy equivalents of the polyglycidyl ether which are present in excess of one epoxy equivalent per equivalent of anions present in the neutral salt of the alkylene polyamine, is within the range of 0.2:1 to 2:1, drying the impregnated material and then subjecting it to a heat treatment at a temperature within the range of 110° C. to 150° C.

3. A process for producing antistatic dressings on synthetic fibers, which comprises impregnating the fibers with an aqueous preparation which contains (a) 0.2 to 8 percent by weight of a water-soluble polyglycidyl ether of a diol of the general formula

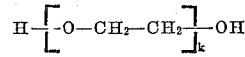

in which $k$ is a whole number from 1 to 7, (b) one to two alkylene polyamines containing 2 to 5 nitrogen atoms, and (c) anions of a mineral acid, the proportion of the alkylene polyamine being in excess of the quantity of amine required to form a neutral salt of the alkylene polyamine with said anions, and in which preparation the ratio of the amino groups of the alkylene polyamine to the epoxy equivalents of the polyglycidyl ether which are present in excess of one epoxy equivalent per equivalent of anions present in the neutral salt of the alkylene polyamine, is within the range of 0.2:1 to 2:1, drying the impregnated material and then subjecting it to a heat treatment at a temperature within the range of 110° C. to 150° C.

4. A process for producing antistatic dressings on synthetic fibers, which comprises impregnating the fibers with an aqueous preparation which contains (a) 0.2 to 8 percent by weight of a water-soluble polyglycidyl ether of ethylene glycol, (b) triethylene tetramine, (c) the neutral hydrochloride of pentamethyl-diethylene triamine, and in which preparation the ratio of the amino groups of triethylene tetramine serving as hardening agent to the epoxy equivalents of the polyglycidyl ether which are present in excess of one epoxy equivalent per equivalent of anions present in the neutral salt of pentamethyl-diethylene triamine, is within the range of 0.2:1 to 2:1, drying the impregnated materal and then subjecting it to a heat treatment.

5. A process for producing antistatic dressings on synthetic fibers, which comprises impregnating the fibers with an aqueous preparation which contains (a) 2.7 percent by weight of a water-soluble polyglycidyl ether of ethylene glycol, (b) 0.11 percent by weight of triethylene tetramine, and (c) 0.9 percent by weight of the neutral hydrochloride of pentamethyl-diethylene triamine, drying the impregnated material and then subjecting it to a heat treatment at a temperature of 150° C.

References Cited in the file of this patent

UNITED STATES PATENTS

| | | |
|---|---|---|
| 2,700,001 | Cohen et al. | Jan. 18, 1955 |
| 2,772,248 | Liberman et al. | Nov. 27, 1956 |
| 2,788,337 | Preiswerk et al. | Apr. 9, 1957 |

UNITED STATES PATENT OFFICE
CERTIFICATION OF CORRECTION

Patent No. 2,965,517                      December 20, 1960

Otto Albrecht et al.

It is hereby certified that error appears in the above numbered patent requiring correction and that the said Letters Patent should read as corrected below.

Column 1, line 59, for "of" read -- or --; column 3, line 23, for "idols" read -- diols --; line 38, for "samewhat" read -- somewhat --.

Signed and sealed this 20th day of June 1961.

(SEAL)
Attest:

ERNEST W. SWIDER                      DAVID L. LADD
Attesting Officer                      Commissioner of Patents